(No Model.)

N. E. SPRINGSTUN.
HORSE SHIELD.

No. 311,267. Patented Jan. 27, 1885.

Attest
J. Paul Mayer
E. Scully

Inventor
Nelson E. Springstun
By Thos. S. Sprague Atty

UNITED STATES PATENT OFFICE.

NELSON E. SPRINGSTUN, OF DETROIT, MICHIGAN.

HORSE-SHIELD.

SPECIFICATION forming part of Letters Patent No. 311,267, dated January 27, 1885.

Application filed September 13, 1884. (No model.)

*To all whom it may concern:*

Be it known that I, NELSON E. SPRINGSTUN, of Detroit, in the county of Wayne and State of Michigan, have invented new and useful Improvements in Horse-Shields; and I do hereby declare that the following is a full, clear, and exact description thereof, reference being had to the accompanying drawings, which form a part of this specification.

This invention relates to certain new and useful improvements in horse-shields, especially adapted to be used upon young stallions to prevent their abusing themselves—a practice into which young horses are apt to fall, thereby injuring to a great extent their virility and usefulness; and the invention consists in the peculiar combinations and the construction and arrangement of parts hereinafter more fully described and claimed.

Figure 1:
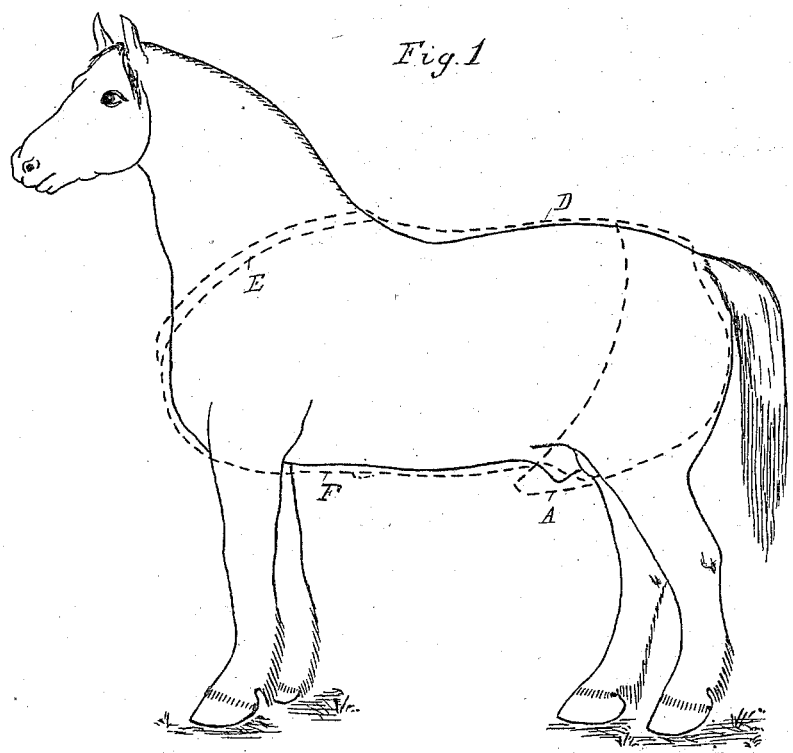
Figure 2:
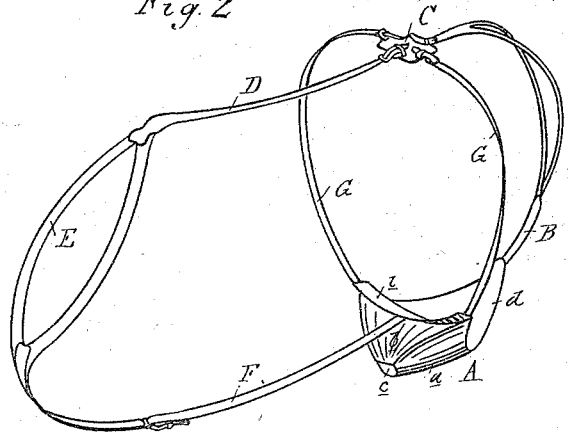
Figure 3:
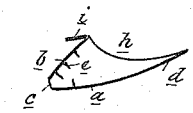

Figure 1 shows the representation of a horse with my shield in place. Fig. 2 is a detached perspective view of the shield with the proper harness or straps attached thereto for securing the same to the animal. Fig. 3 is a vertical longitudinal central section through the shield proper.

In the accompanying drawings, which form a part of this specification, A represents the shield proper, which is preferably made of leather, and somewhat in the form of a flattened truncated cone with the apex cut off.

$a$ represents the bottom, and $b$ the top, their edges being stitched together or otherwise firmly secured, leaving the aperture or opening $c$ for the free passage of water. The lower section, $a$, terminates in a V-shaped apron, $d$, which is designed to project rearward and cover the parts, while the upper portion, $b$, is designed to rest against the belly of the animal in such a manner as to inclose the animal's sheath. Sharpened tacks or points $e$ project inward from the upper and lower portions of the shield, so that any projection the animal may make from the sheath is met by these points, and the projection instantly retracted. A strap, B, is secured to the rear end of the apron $d$, and adapted to pass between the rear legs and embrace the tail, and by a buckle at C is secured to a back-strap, D, which connects with a collar, E, which in turn connects with another strap, F, which passes between the fore legs of the animal to the shield and loin-straps G, connecting with the sides of the shield, and, passing up either side of the animal, are buckled at C all together.

I do not desire to confine myself to this special construction of harness, as various changes may be made and used without departing from the spirit of my invention.

The harness attachment should be so well fitted to the animal, when standing, that it will hold the shield in place with its rear entrance, $h$, open, to embrace the sheath of the animal. In order to insure this the strap B is secured to the rear end of the apron $d$, while the strap F is secured to a ledge, $i$, secured across the upper part, $b$, just in front of the mouth $h$. When the animal lies down, the holding-straps will slacken up so that the two parts $a$ and $b$ will fold together, so that the spurs will be hidden. When the animal rises, the change in position will tighten up the straps and open the shield, as already described.

I am aware that testicle-supports for stallions have heretofore been used; but such devices would be of no use for the purpose for which my shield is designed.

I am also aware of the Patent No. 33,162, and make no claim to the construction shown therein as forming part of my invention, as the device therein shown and described would not accomplish the purpose of my shield.

What I claim as my invention is—

The shield A, interiorly provided with spurs, and having a water-outlet, in combination with the strap B, secured to the rear end thereof and adapted to embrace the tail of the animal, the back-strap D, the strap F, secured to the front of said shield and connected with the collar E, which is connected to said back-strap, and the loin-straps G, the straps D, B, and G all being buckled together at C, substantially as and for the purposes specified.

NELSON E. SPRINGSTUN.

Witnesses:
H. S. SPRAGUE,
E. SCULLY.

Correction in Letters Patent No. 311,267.

Affidavit having been filed showing that the name of the patentee in Letters Patent No. 311,267, granted January 27, 1885, for an improvement in "Horse-Shields," should have been written and printed *Nelson E. Springsteen* instead of "Nelson E. Springstun," it is hereby certified that the proper correction has been made in the files and records of the case in the Patent Office, and should be read in the said Letters Patent that the same may conform thereto.

Signed, countersigned, and sealed this 27th day of September, A. D. 1887.

[SEAL.]

D. L. HAWKINS,
*Acting Secretary of the Interior.*

Countersigned:

BENTON J. HALL,
*Commissioner of Patents.*